Sept. 4, 1934.  N. A. J. VOORHOEVE ET AL  1,972,806
CONTROLLING DEVICE COMPRISING A TRIODE
Filed Dec. 31, 1931

Inventors:
N. H. J. Voorhoeve
and F. H. de Jong,
by E. F. Wenderoth
Atty.

Patented Sept. 4, 1934

1,972,806

UNITED STATES PATENT OFFICE 1,972,806

CONTROLLING DEVICE COMPRISING A TRIODE

Nicolaas Anthony Johannes Voorhoeve and Frans Hendrik de Jong, Eindhoven, Netherlands, assignors to N. V. Philips' Gloeilampenfabrieken, Eindhoven, Netherlands Application December 31, 1931, Serial No. 584,306 In Germany February 2, 1931

5 Claims. (Cl. 171—229)

Regulating devices which use triodes and are designed for the regulation of the voltage or of the number of revolutions of electric machines, are of particular advantage in those cases in which a high degree of accuracy and of rapidity of regulation is desired. Such devices comprise as a rule amplifying tubes or valves connected in cascade, in which to the grid of the first tube a voltage is applied which depends on the magnitude to be regulated and in which the output of the last valve acts on the current of an exciting winding of the machine. In order to adjust the valves to the correct point of the characteristic curve it is necessary in most cases to insert in the grid circuits of the valves individual sources of proper voltage, for example batteries. It has been found that, due to the large number of sources of voltage, disturbances may easily be produced.

According to the invention, in order to increase the reliability of service of such installations, high resistances are connected into the grid circuits of the triodes.

The invention will be explained more fully with reference to the accompanying drawing the three figures of which represent diagrammatically three embodiments of the invention.

Figure 1:
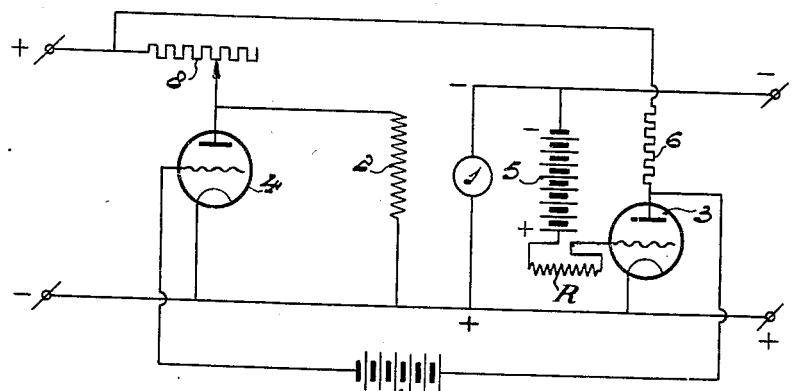

In Figure 1, 1 denotes a generator whose voltage has to be regulated to a determined value. The exciting winding 2 of the generator 1 is connected in parallel with a triode 4, this parallel connection being connected through a resistance 8 to a direct-current network. The grid of the valve 4 is connected through a battery 7 to the anode of the valve 3, to the grid of which is directly applied the voltage to be regulated. The anode of the valve 3 is connected through a coupling resistance 6 to the positive terminal of the source of voltage; as such may serve the direct-current network which supplies the exciting current for the machine 1. In the grid circuit of the valve 3 is inserted a battery 5 which is so dimensioned that the grid has a negative potential relative to the cathode.

Figure 2:
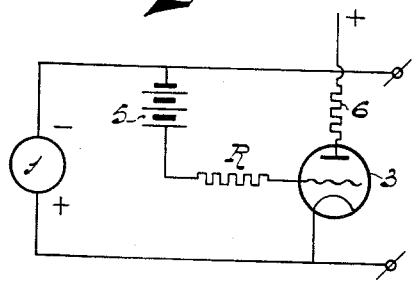
Figure 3:
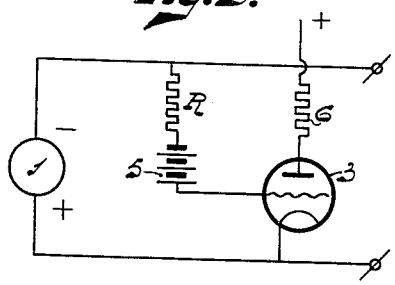

According to the invention, the grid circuit of the triode valve 3 comprises in addition a high resistance R which may be connected either between the positive terminal of the battery 5 and the grid of the valve 3 or between the negative terminal of the battery and the negative terminal of the generator. These two methods of connecting the resistance R, which preferably has a value of several megohms, are shown in Figures 2 and 3 from which for the sake of simplicity the valve 4 and its circuits are omitted.

It is advantageous to provide each grid circuit of the valve of a cascade arrangement with such a resistance. If now by some cause or other the generator voltage is suppressed so that the grid of the valve 3 becomes strongly positive with respect to the cathode, the resistance strongly limits the grid current so that the sources of voltage, which are for example dry batteries, are not discharged.

What we claim is:

1. A thermionic regulator for electric machines, comprising at least one triode having a cathode, a grid and an anode; a grid circuit for said triode connected between the cathode and the grid, a source of direct voltage adapted to be applied to said circuit and having a voltage which varies in the same sense as the quantity to be regulated, a second source of voltage having a constant value also connected in said circuit, and opposing said first voltage, the positive terminal of the second voltage source being connected to the grid side of the grid circuit, and a resistance of high value inserted in the grid circuit to protect the second voltage source against excessive discharge currents when the varying voltage applied to the circuit becomes too small.

2. A thermionic regulator for electric machines, comprising a triode having a cathode, a grid and an anode, a grid circuit for said triode comprising a cathode, a grid, and two sources of voltage for said circuit, the first source supplying a fluctuating direct voltage which varies in the same sense as the quantity to be regulated, said second voltage source being a dry battery supplying a voltage in opposition to said first source, the positive terminal of said battery being connected to the grid side of the grid circuit, and a resistance having a value of several megohms inserted in the grid circuit for protecting the battery against excessive discharge when the varying voltage applied becomes too small.

3. A system for voltage regulation, comprising an electric generator, a field coil therefor and a resistance in series with said field coil, a triode comprising a cathode, an anode and a grid, said anode and cathode being connected across said field coil, a second triode comprising an anode, a grid and a cathode, two voltage sources inserted between said last-mentioned grid and cathode, one of said voltage sources having a fluctuating voltage varying in the same way as the generator voltage, the second source having a constant value and opposing said fluctuating voltage, a resistance in the last grid circuit having a high value and preventing excessive current flow through the said circuit when the fluctuating voltage falls to a low value, an anode circuit for the second triode, a grid circuit for the first triode, the said anode circuit influencing the grid circuit in such a manner as to hold the generator voltage constant.

4. A system for voltage regulation, comprising an electric generator, a field coil therefor, a triode comprising a cathode, anode and a grid, said anode and cathode being connected across said field coil, a second triode comprising an anode, a grid and cathode, and a grid circuit for said last-mentioned grid, said circuit comprising two voltage sources, one of which fluctuates in the same way as the generator voltage, and the second source having a constant value and opposing said fluctuating voltage, and a resistance of high value in said circuit and preventing an excessive current flow through the grid circuit when the fluctuating voltage falls to a low value, the said first triode having a grid circuit comprising two sources, one being a fluctuating voltage varying in the same way as the generator voltage, said second source having a constant value, said second triode supplying the fluctuating voltage source for the grid circuit of the first triode.

5. A system for voltage regulation, comprising an electric generator, a field coil therefor and a resistance in series with said field coil, a triode comprising a cathode, an anode and a grid, said anode and cathode being connected across said field coil, a second triode comprising an anode, a grid and a cathode, two voltage sources inserted between said last-mentioned grid and cathode, one of said voltage sources having a fluctuating voltage varying in the same way as the generator voltage, the second source being a dry battery and opposing said fluctuating voltage, a resistance in the last grid circuit having a high value and preventing excessive current drain of said battery when the fluctuating voltage falls to a low value, an anode circuit for the second triode, and a grid circuit for the first triode, the said anode circuit influencing the grid circuit in such a manner as to hold the generator voltage constant.

NICOLAAS ANTHONY
JOHANNES VOORHOEVE.
FRANS HENDRIK DE JONG.